United States Patent
Kuo et al.

US011876631B2

(10) Patent No.: US 11,876,631 B2
(45) Date of Patent: Jan. 16, 2024

(54) NETWORK INFORMATION TRANSMISSION METHOD AND NETWORK INFORMATION TRANSMISSION SYSTEM

(71) Applicant: AVerMedia TECHNOLOGIES, INC., New Taipei (TW)

(72) Inventors: Chung-Song Kuo, New Taipei (TW); Fu-Ping Wang, New Taipei (TW)

(73) Assignee: AVERMEDIA TECHNOLOGIES, INC., New Taipei (TW)

(*) Notice: Subject to any disclaimer, the term of this patent is extended or adjusted under 35 U.S.C. 154(b) by 64 days.

(21) Appl. No.: 17/586,836

(22) Filed: Jan. 28, 2022

(65) Prior Publication Data
US 2022/0247592 A1 Aug. 4, 2022

Related U.S. Application Data

(60) Provisional application No. 63/144,990, filed on Feb. 3, 2021.

(51) Int. Cl.
*H04L 12/18* (2006.01)
*G06F 21/62* (2013.01)

(52) U.S. Cl.
CPC ...... *H04L 12/1827* (2013.01); *G06F 21/6254* (2013.01); *H04L 12/1818* (2013.01); *H04L 12/1822* (2013.01)

(58) Field of Classification Search
CPC ............. H04L 12/1827; H04L 12/1818; H04L 12/1822; G06F 21/6254
See application file for complete search history.

(56) References Cited

U.S. PATENT DOCUMENTS

| | | | |
|---|---|---|---|
| 8,958,683 B2* | 2/2015 | Lu | H04N 21/4147 386/230 |
| 2010/0223334 A1* | 9/2010 | Narayanan | H04L 12/1818 709/204 |
| 2011/0142121 A1* | 6/2011 | Hayden | H04N 19/40 375/E7.026 |
| 2013/0147896 A1* | 6/2013 | Cook | H04N 7/142 348/14.1 |
| 2018/0020224 A1* | 1/2018 | Su | H04N 19/192 |
| 2020/0342084 A1* | 10/2020 | Zhao | G10L 15/26 |
| 2022/0201367 A1* | 6/2022 | Hunsaker | H04N 21/8456 |

* cited by examiner

*Primary Examiner* — John A Follansbee
*Assistant Examiner* — Raqiul A Choudhury
(74) *Attorney, Agent, or Firm* — McClure, Qualey & Rodack, LLP (57) ABSTRACT

A network information transmission method, comprising the following steps: receiving a first media information by a first terminal device; processing the first media information to obtain a processed first media information; integrating the processed first media information into a second media information to generate an integrated second media information; outputting the integrated second media information to a second terminal device through the network; decompressing the integrated second media information through the second terminal device; capturing the integrated second media information through the second terminal device; obtaining the first media information based on the integrated second media information; and playing the first media information by the second terminal device.

15 Claims, 6 Drawing Sheets

NETWORK INFORMATION TRANSMISSION METHOD AND NETWORK INFORMATION TRANSMISSION SYSTEM

CROSS-REFERENCE TO RELATED APPLICATION

This application claims priority to U.S. Provisional Application Ser. No. 63/144,990, filed Feb. 3, 2021, which is herein incorporated by reference in its entirety.

BACKGROUND

Technical Field

The present disclosure relates to a network information transmission method and a network information transmission system, especially a technology capable of transmitting media information from a first terminal device to a second terminal device.

Description of Related Art

With the rapid development of network streaming, video conferencing becomes increasingly popular. However, the problem of information security is increasingly severe. For example, if popular video conference program on the market has loopholes, hackers may steal user's video information by attacking the program, thus causing the user's privacy to be leaked.

SUMMARY

One aspect of the present disclosure is a network information transmission method, comprising: receiving, by a first terminal device, a first media information; processing the first media information to obtain a processed first media information; integrating the processed first media information into a second media information to generate an integrated second media information; outputting the integrated second media information to a second terminal device through a network; decompressing, by the second terminal device, the integrated second media information; capturing, by the second terminal device, the integrated second media information; obtaining the first media information based on the integrated second media information; and playing, by the second terminal device, the first media information.

Another aspect of the present disclosure is a network information transmission method, applied to a video streaming unit communicating between a first terminal device and a second terminal device, wherein the network information transmission method comprises: receiving, by the first terminal device, a first media information; processing the first media information to obtain a processed first media information, wherein the processed first media information comprises a major data of the first media information; integrating the processed first media information into a second media information to generate an integrated second media information, wherein the integrated second media information comprises the second media information and the processed first media information hidden in the second media information; receiving, by the first terminal device, the integrated second media information through the video streaming unit; compressing, by the first terminal device, the integrated second media information through the video streaming unit, so as to output a compressed integrated second media information to the second terminal device through a network; receiving, by the second terminal device, the compressed integrated second media information through the video streaming unit; decompressing, by the second terminal device, the compressed integrated second media information through the video streaming unit; playing, by the second terminal device, an image of the integrated second media information through the video streaming unit; screen capturing, by the second terminal device, the image of the integrated second media information; obtaining, by the second terminal device, the integrated second media information to obtain the first media information; and playing, by the second terminal device, the first media information.

Another aspect of the present disclosure is a network information transmission system, comprising a first terminal device and a second terminal device. The first terminal device is configured to generate a processed first media information according to a first media information. The first terminal device is further configured to integrate the processed first media information into a second media information to generate an integrated second media information. The second terminal device is coupled to the first terminal device, so as to receive the integrated second media information through a video streaming unit. The second terminal device is further configured to decompress the integrated second media information to playing an image of the integrated second media information through the video streaming unit. The second terminal device is further configured to screen capture the image of the integrated second media information, and configured to obtain the first media information based on the integrated second media information.

It is to be understood that both the foregoing general description and the following detailed description are by examples, and are intended to provide further explanation of the disclosure as claimed.

BRIEF DESCRIPTION OF THE DRAWINGS

The present disclosure can be more fully understood by reading the following detailed description of the embodiment, with reference made to the accompanying drawings as follows.

DETAILED DESCRIPTION

For the embodiment below is described in detail with the accompanying drawings, embodiments are not provided to limit the scope of the present disclosure. Moreover, the operation of the described structure is not for limiting the order of implementation. Any device with equivalent functions that is produced from a structure formed by a recombination of elements is all covered by the scope of the present disclosure. Drawings are for the purpose of illustration only, and not plotted in accordance with the original size.

It will be understood that when an element is referred to as being "coupled to", it can be directly or indirectly coupled to the other element or intervening elements may be present, and can also be used to indicate that two or more elements cooperate with each other to operate or interact with each other. In addition, although terms such as "first" and "second" are used herein to describe different elements, the terms are only used to distinguish elements or operations described by the same technical terms. Unless clearly indicated by the context, the terms do not specifically refer to or imply an order or sequence, nor are they intended to limit the present disclosure.

The present disclosure provides a network information transmission method and a network information transmission system to improve user privacy. In one embodiment, the network information transmission method and the network information transmission system are applied to video streaming (e.g., video conferencing or live streaming) to improve information security of video streaming. In other embodiments, the network information transmission method and the network information transmission system can also cover the video streaming method and system, or the network information transmission method and the network information transmission system can itself be a video streaming (e.g., video conferencing or live streaming) method and system.

Figure 1:
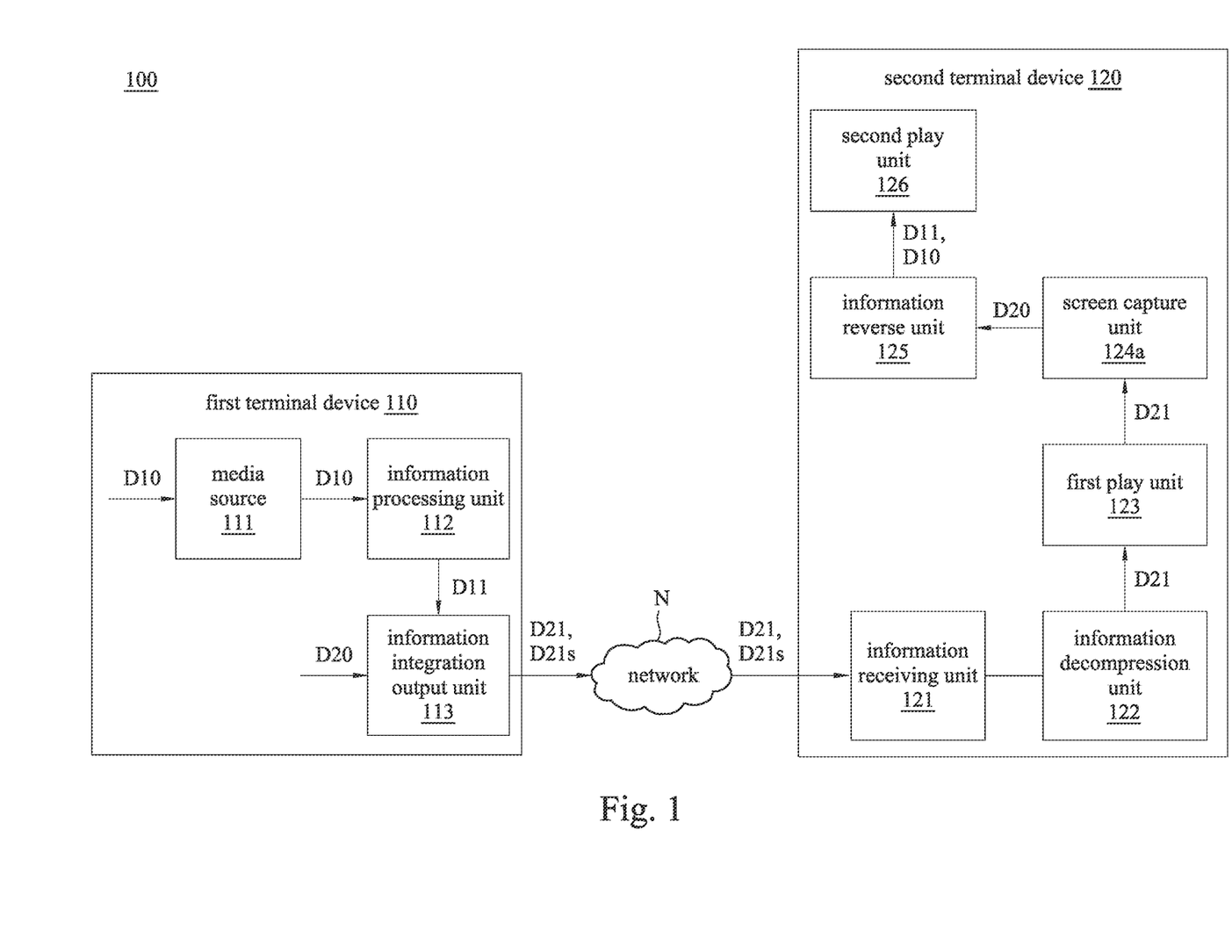
FIG. 1 is a schematic diagram of a network information transmission system in some embodiments of the present disclosure.

FIG. 1 is a schematic diagram of a network information transmission system in some embodiments of the present disclosure. The network information transmission system 100 is configured to transmit/streaming information of a first terminal device 110 (near end) to a second terminal device 120 (far end) through network N. The first terminal device 110 may be a local device such as a near end device or a cloud device. Similarly, the second terminal device 120 may also be a local device such as the far end device or a cloud device, which is not limited herein. The first terminal device 110 and the second terminal device 120 are connected through network N for data transmission.

Figure 2:
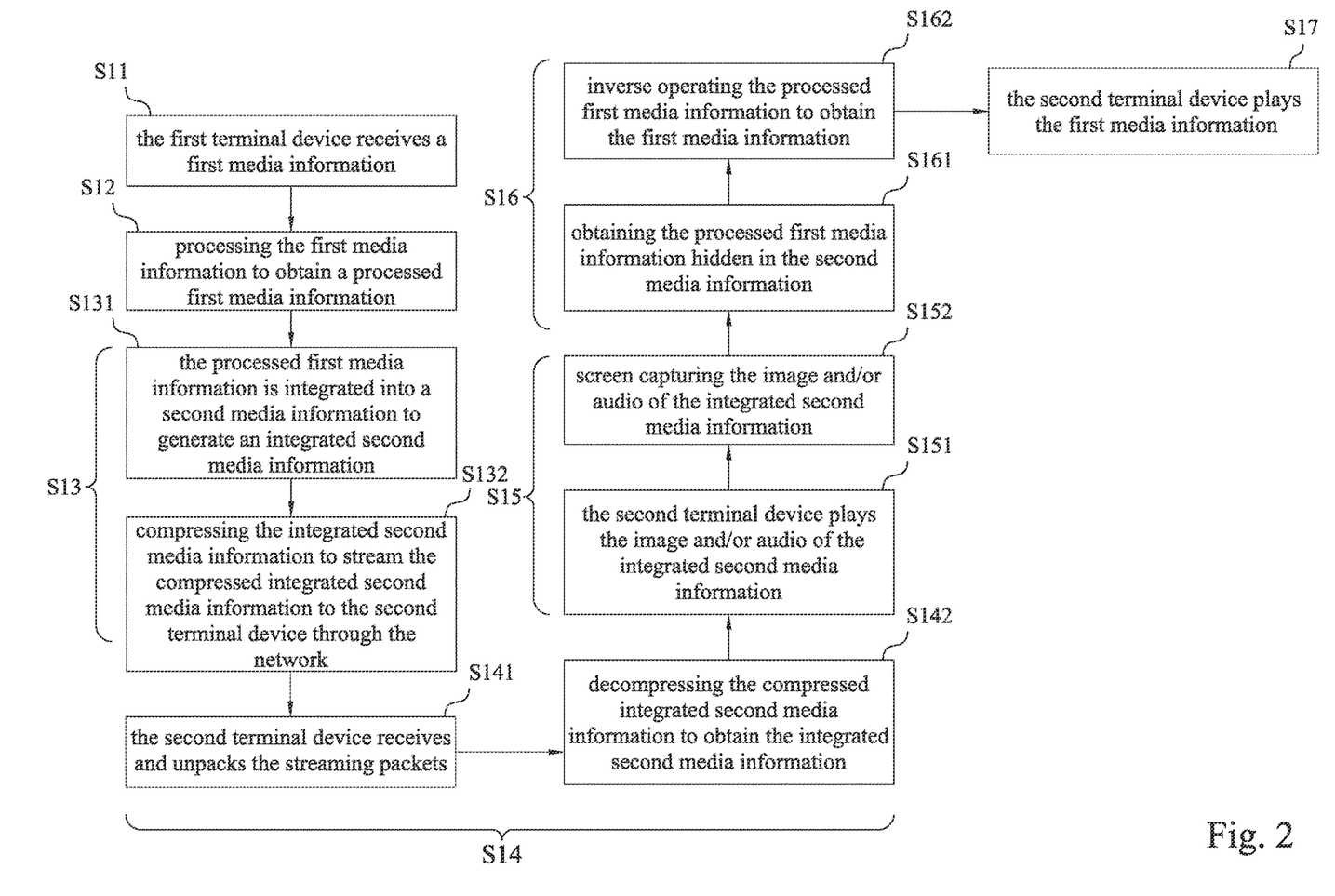
FIG. 2 is a flowchart illustrating a network information transmission method in some embodiments of the present disclosure.

FIG. 2 is a flowchart illustrating a network information transmission method in some embodiments of the present disclosure. As shown in FIG. 1 and FIG. 2, in step S11, the first terminal device 110 receives a first media information D10. In step S12, the first terminal device 110 processes the first media information D10 to obtain a "processed first media information D11". In other words, the first terminal device 110 is configured to convert the first media information D10 to generate "the processed first media information D11". The processing of the first terminal device 110 will be described in detail in the following paragraphs.

In step S13, the processed first media information D11 is integrated into the second media information D20 to generate a "integrated second media information D21". Then, outputting the integrated second media information D21 to the second terminal device 120 through network N. The detail of the processed first media information D11 is integrated into the second media information D20 will be described in the following paragraphs.

In step S14, the second terminal device 120 decompress the integrated second media information D21. In step S15, after the decompression is completed, the second terminal device 120 captures (eg, screen capturing or data capturing) the integrated second media information D21. In step S16, the second terminal device 120 obtains the first media information D10 based on the integrated second media information D21. In this case, the second terminal device 120 reverses the integrated second media information D21 back to the first media information D10 by reverse method. In step S17, the second terminal device 120 plays the first media information D10.

As mentioned above, the network information transmission method of the present disclosure integrates the processed first media information D11 into the second media information D20, and then reverse the integrated second media information D21 by the second terminal device 120. Accordingly, after the second terminal device 120 obtain the first media information D10, the first media information D10 can be play, so the user privacy can be strengthened to improve the information security.

In one embodiment, the network information transmission method can transmit the information of the first terminal device 110 (e.g., the near end) through the network streaming to the second terminal device 120 (e.g., the far end). The transmission of the streaming may be a "one-way transmission" (e.g., live streaming) transmitting information from the first terminal device 110 to the second terminal device 120. The network information transmission method can also be "two-way transmission" (e.g., video conference) that can transmit information between the first terminal device 110 and the second terminal device 120.

In one embodiment, the above step S11 receives the first media information D10 from the first terminal device 110, wherein the first media information D10 may be image information and/or sound information. The image information can be video information or picture information, or other multimedia information. The first media information D10 can be generated or received by a media source 111 (e.g., the video source/audio source). The media source can be an video/audio input device, such as a camera and/or a microphone arranged in or externally connected to the first terminal device 110. The first media information D10 includes a private user information, which is private to the user. For example, the user's important photos, videos or voices and other private content (e.g., the privacy of people or things), or other important information of the user.

In one embodiment, in the above step S12, the processed first media information D11 includes a major data of the first media information D10. For example, "processing" may be sorting the first media information D10 (e.g., an original media information) to obtain the major data and a temporal redundancy data, respectively. Then, removing the temporal redundancy data so that the processed first media information D11 includes the major data of the first media information D10, but does not include the temporal redundancy data. By removing the temporal redundancy data, the amount of data to be hidden later is reduced.

Specifically, the temporal redundancy data can be the temporal redundancy data in time, the temporal redundancy data in space (spatial redundancy), the temporal redundancy data in statistics (statistical redundancy), or the temporal redundancy data in perception (perceptual redundancy). For example, it can be multiple repeated information, or information that cannot be recognized by the naked eye or perception, which is not limited here. The manner of obtaining the temporal redundancy data include but are not limited to the following: in one embodiment, description or estimation of interpixel correlation is used, such as DCT, DWT, DPCM. In other embodiment, psychovisual characteristics, such as various quantization methods, the insensitivity of the human eye to high-frequency information are used. In other embodiment, a binary coding technique is used, such as variable-lengthcode, Huffmancode, arithmeticcode.

The processed first media information D11 can also an include reverse information of the first media information D10, which can be used to inverse operation the processed first media information D11 so as to obtain the first media information D10.

In some embodiments, in the above step S12, the processed first media information D11 includes the compressed first media information. the compressed first media information can be an image-coded bitstream, such as an H.264 bitstream.

In some embodiments, in the above step S13, the processed first media information D11 can be integrated into the second media information D20. For example, the major data of the processed first media information D11, the recovered information or a combination thereof, can be integrated into the second media information D20. The second media information D20 may include the image information and/or the sound information. The first image information can be video information or image information, or other multimedia media information. In addition, the second media information D20 can be generated by the media source 111, or can be a preset data. In this embodiment, in step S13, the processed first media information D11 is integrated into the second media information D20 by embedding. In this embodiment, the integrated second media information D21 includes the second media information D20 and the processed first media information D11 hidden in the second media information D20.

In this embodiment, "integrate/embed" can be implemented by a steganography embedding manner, so that the processed first media information D11 is invisible in the second media information D20. The steganography embedding manner can be either spatial domain embedding or frequency domain embedding. Spatial domain embedding can be implemented by neural network technology, statistical technology, spread spectrum technology, cryptography technology, vector quantization (VQ) or fractal coding method, etc., but not limited to this. Frequency domain embedding can be implemented by discrete cosine transform (DCT), discrete wavelet transform (DWT), discrete Fourier transform (DFT), etc., but not limited to this.

In addition, in one embodiment, taking both the second media information D20 and the first media information D10 as the image information as an example, the processed first media information D11 may include one or more first image information (e.g., first image frame). The second media information D20 includes one or more second image information (e.g., second image frame). In one embodiment, one first image information can be integrated into one second image information. In other embodiments, one first image information can be split and integrated into multiple second image information in batches. In other embodiments, multiple first image information can be integrated into one second image information. In other embodiments, multiple first image information can be integrated into multiple second image information.

In addition, the processed first media information D11 can be hidden on the second media information D20. The above "hidden" can refer to information that is not easily perceptible or invisible to the human vision system. For example, when playing the integrated second media information D21, the first media information D10 will not be seen by the user because it is hidden on the second media information D20, so as to ensure the information security of the first media information D10. In other words, the privacy of the first media information can be protected. In addition, in the above embodiment, the first terminal device 110 processes the second media information D20 by a "frequency domain conversion manner" to identify or find at least one relatively low frequency part of the second media information D20. Then, the processed first media information D11 is placed/embedded into the relatively low frequency part of the second media information D20 to achieve a hidden effect.

In addition, it should be noted that, the processed first media information D11 being integrated into the second media information D20 by embedding can also be regarded as an encryption process.

In this embodiment, when the processed first media information D11 is the major data of the first media information D10, or the compressed first media information, the processed first media information D11 can be hidden in the second media information D20 through steganography embedding manner. Taking the first media information D10 and the second media information D20 as the image information as an example, the major data may be one or more first image information (eg, first image frames), and the compressed first media information may be one or more image-coded bitstream. When the processed first media information D11 is the major data of the first media information D10, one or more first image information can be hidden in one or more second image information (eg, second image frame) of the second media information D20 by the steganography embedding manner. When the processed first media information D11 is the compressed first media information, one or more image-coded bitstreams can be hidden in one or more second image information (e.g., second image frame) of the second media information D20 by steganography embedding manner.

In this embodiment, the second media information D20 can be the original image or the edited image of the major data. For example, the image of the major data can be, for example, but not limited to, Intra-coded pictures in H.264. The image of the major data can also be different according to the design of the actual compression technology, for example, it can be an image slice, which is not limited here.

Specifically, the above step S13 further includes step S131 and step S132. In step S131, the processed first media information D11 is integrated into the second media information D20 to generate the integrated second media information D21. In step S132, compressing the integrated second media information D21 to stream the compressed integrated second media information D21 to the second terminal device 120 through network N.

In this embodiment, step S132 can compress the integrated second media information D21 and package it into the streaming packets D21s, and then output the streaming packets D21s to the second terminal device 120 through network N (e.g., Internet).

In some embodiments, the above step S14 further includes step S141 and step S142. In step S141, the second terminal device 120 receives and unpacks the above streaming packets D21s. In step S142, decompressing the streaming packets D21s (i.e., the compressed integrated second media information D21) to obtain the integrated second media information D21. Since person having ordinary skill in the art can understand the methods of package and unpacks, it will not be repeated here.

In this embodiment, the above step S15 further includes step S151 and step S152. In step S151, the second terminal device 120 plays image and/or audio of the integrated second media information D21. In step S152, screen capturing the image and/or audio of the integrated second media information D21 played by the second terminal device 120. Take the media information as "the image information" as an example, the play content can be images. Take the above media information as "the sound information" as an example, the play content can be sound.

Taking the play content as "image" as an example, in step S151, the video player program of the second terminal device 120 plays the image of the integrated second media information D21. The user can see the second media information D20 through the display panel of the second terminal device 120, and the first media information D10 will not be seen by the user because it is hidden. In addition, in step S152, the above image can be captured through "screen capture" (the integrated second media information D21). The above "screen capture" can be the image capture of the window, and the capture range can refer to all or part of the entire window. "Window" refers to the area of a specific video player program, or the entire area of the display panel. For example, when the second terminal device 120 plays the second media information D20 (or the integrated second media information D21), the second terminal device 120 can monitor the video player program through the display panel, to capture the display area of the video player program, or capture the display area of the entire screen.

In this embodiment, step S16 further includes step S161 and step S162. In step S161, obtaining the processed first media information D11 hidden in the second media information D20. In step S162, inverse operating the obtained processed first media information D11 to obtain the first media information D10.

In this embodiment, step S161 can extract the processed first media information D11 hidden in the second media information D20 by the embedding of "reverse steganography". The "steganography embedding manner and step" mentioned in step S13 corresponds to the "reverse steganography" mentioned in S161. For example, the steganography embedding implements hidden information in a specific way, and reverse steganography finds hidden information in a specific corresponding way.

In addition, in this embodiment, the inverse operating of step S162 and the processing of step S12 are corresponding. For example, the processing of step S12 may be to process the first media information D10 into "non-original" media information (e.g., the major data, reverse information or a combination thereof, or compressed media information, etc.) The inverse operating of step S162 is to inverse operating the processed first media information D11 to obtain the first media information D10. In some embodiments, inverse operation can be used with reverse information, or other data that can be used to reverse data, so as to improve the integrity of the original media data after reverse, but the present disclosure is not limited to this.

In addition, it should be noted that, the process of obtaining the first media information D10 base on the integrated second media information D21 can also be regarded as a decryption process.

In this embodiment, after step S162, inverse operating and obtaining the first media information D10 (e.g., original media information). Step S17 can play the first media information D10 through another video player program. At this time, for the user, the first media information D10, which is more private, is played through another video player program, so the user privacy can be strengthened and the information security can be improved.

Furthermore, as shown in FIG. 1, the first terminal device 110 of the network information transmission system 100 includes a media source 111, an information processing unit 112 and an information integration output unit 113. The second terminal device 120 includes an information receiving unit 121, an information decompression unit 122, a first play unit 123, a screen capture unit 124a, an information reverse unit 125, and a second play unit 126. These units can be implemented by software or hardware. In addition, the network information transmission system 100 can be implemented with the above network information transmission method.

Specifically, the media source 111 is configured to perform step S11. The information processing unit 112 is coupled to the media source 111, and is configured to perform step S12. The information integration output unit 113 is coupled to the information processing unit 112, and is configured to connect to network N, so as to perform step S13.

the information receiving unit 121 can connect to network N, so as to perform step S141. The information decompression unit 122 is coupled to the information receiving unit 121, and is configured to perform step S142. The first play unit 123 is coupled to the information decompression unit 122, and is configured to perform step S151. The screen capture unit 124a is coupled to the first play unit 123, and performs step S152. The information reverse unit 125 is coupled to the screen capture unit 124a, and is configured to perform step S16. The second broadcast unit 126 is coupled to the information reverse unit 125, and is configured to perform step S17. The details have been explained in the preceding paragraphs, so it will not be repeated here.

Figure 3:
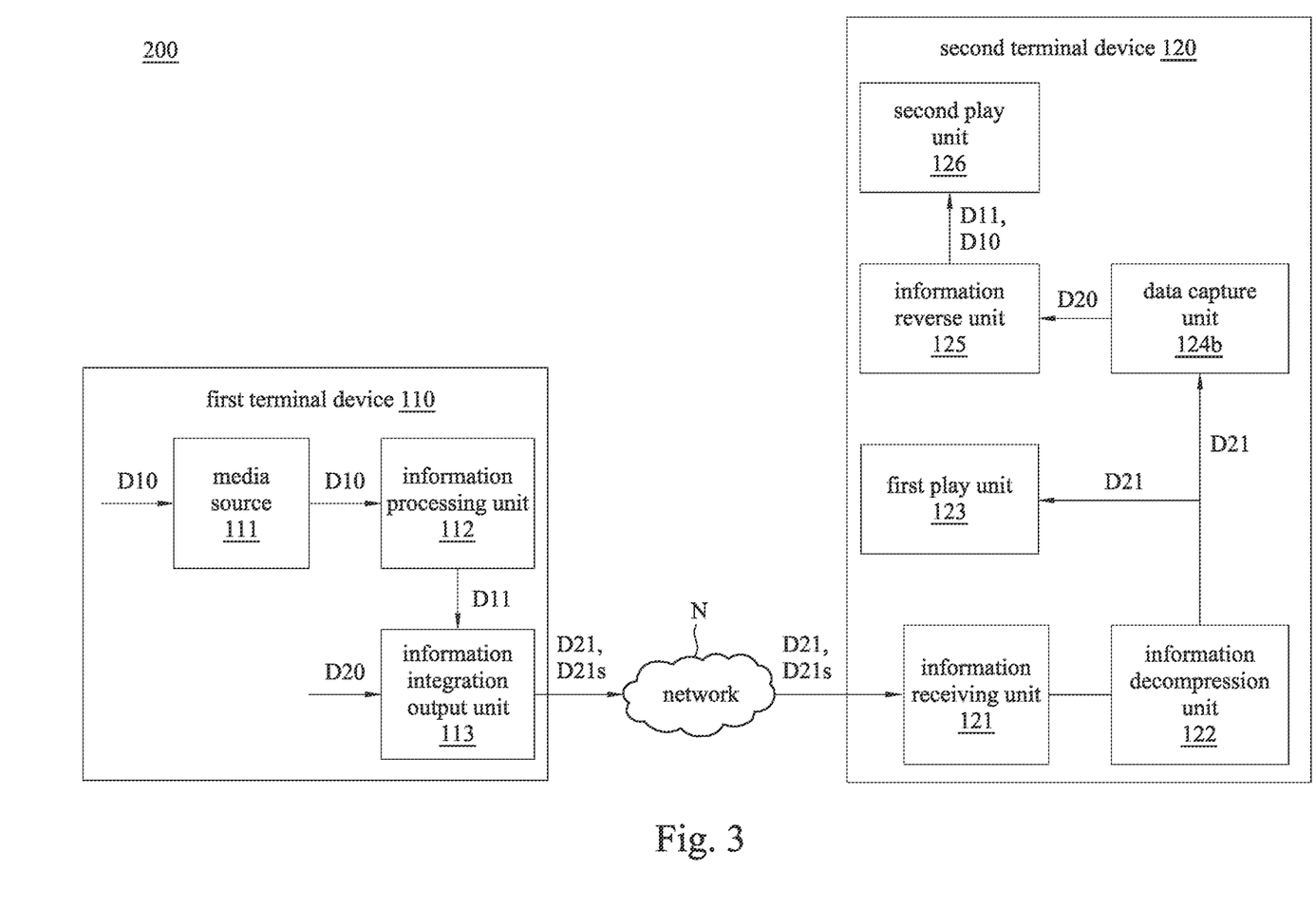
FIG. 3 is a schematic diagram of a network information transmission system in some embodiments of the present disclosure.

FIG. 3 is a schematic diagram of a network information transmission system 200 in some embodiments of the present disclosure. In FIG. 3, the similar components associated with the embodiment of FIG. 1 are labeled with the same numerals for ease of understanding. The specific principle of the similar component has been explained in detail in the previous paragraphs, and unless it has a cooperative relationship with the components of FIG. 3, it is not repeated here. The difference between FIG. 3 and FIG. 1 is that the configuration of the data capture unit 124b, the information reverse unit 125 and the second play unit 126 of the second terminal device 120. In this embodiment, the first play unit 123 and the information decompression unit 122 are coupled to perform step S151. The data capture unit 124b and the information decompression unit 122 are coupled to capture the data of the integrated second media information D21, such as picture data, audio data or other multimedia data. In addition, the network information transmission system 200 can directly output the decompressed information through the third party program. The information reverse unit 125 is configured to perform step S16, and the second play unit is configured to perform step S17.

Figure 4:
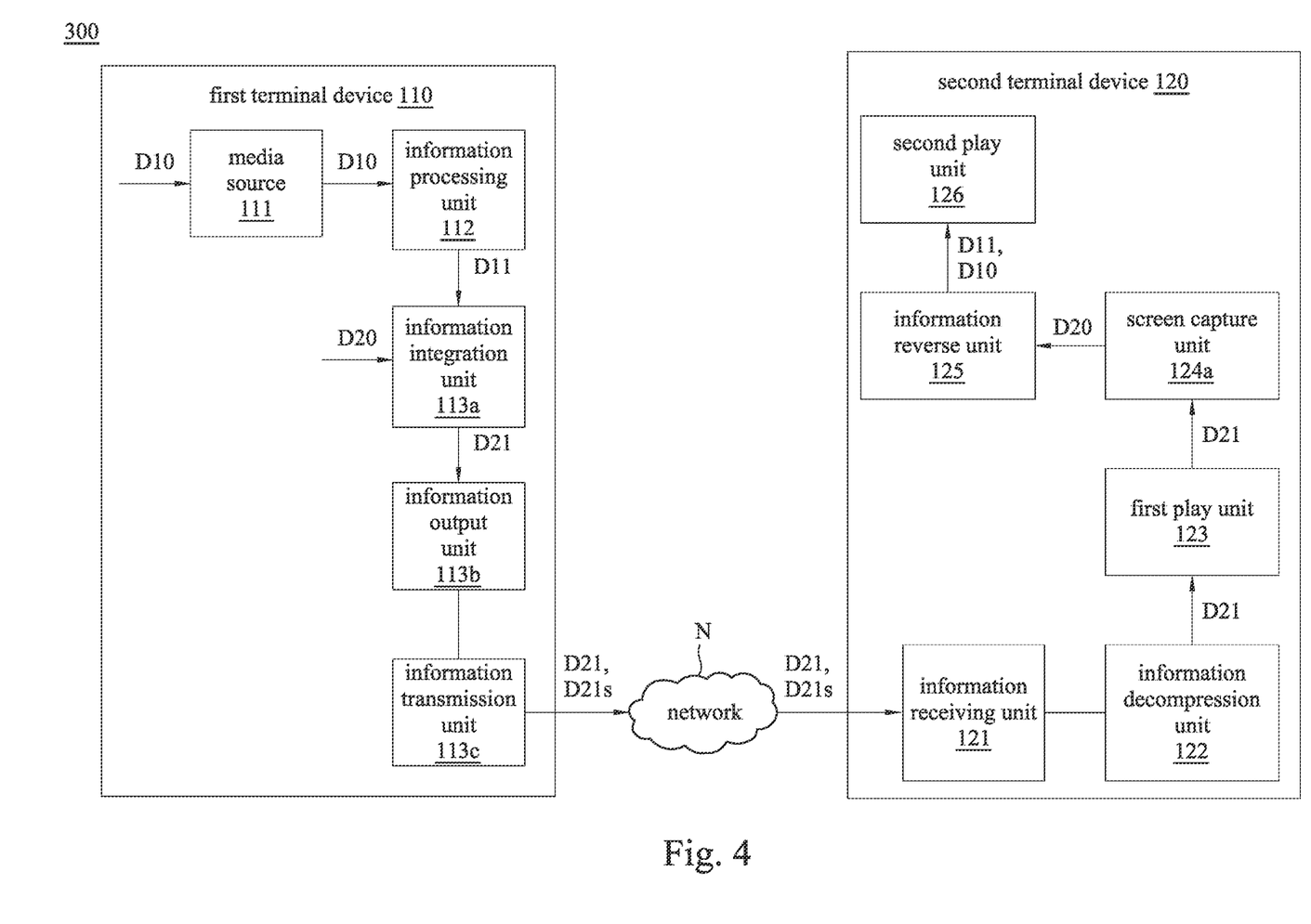
FIG. 4 is a schematic diagram of a network information transmission system in other embodiments of the present disclosure.

FIG. 4 is a schematic diagram of a network information transmission system 300 in some embodiments of the present disclosure. In FIG. 4, the similar components associated with the embodiment of FIG. 1 are labeled with the same numerals for ease of understanding. The specific principle of the similar component has been explained in detail in the previous paragraphs, and unless it has a cooperative relationship with the components of FIG. 4, it is not repeated here.

The difference between FIG. 4 and FIG. 1 is that the information integration output unit 113 is subdivided into the information integration unit 113a, the information output unit 113b and the information transmission unit 113c. The information integration unit 113a is coupled to the information processing unit 112, and is configured to perform step S131. The information output unit 113b and the information transmission unit 113c are configured to perform step S132. Specifically, the information output unit 113b is configured to compress the integrated second media information D21. The information transmission unit 113c is configured to package the second media information D20 as the streaming packets D21s. Then, streaming through network N (e.g., the Internet), and outputting the streaming packets D21s to the second terminal device 120.

Figure 5:
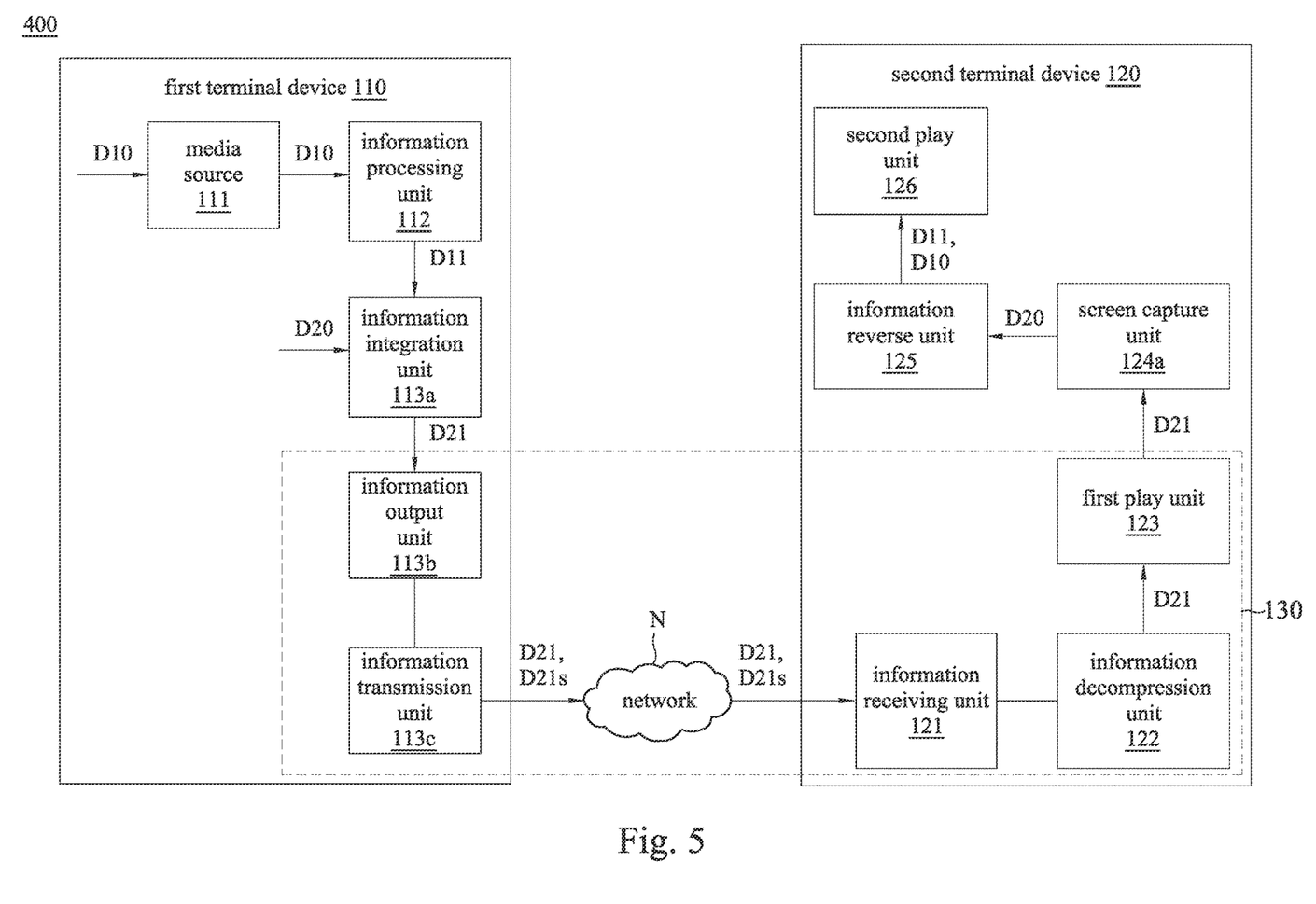
FIG. 5 is a schematic diagram of a network information transmission system in other embodiments of the present disclosure.

FIG. 5 is a schematic diagram of a network information transmission system 400 in some embodiments of the present disclosure. In FIG. 5, the similar components associated with the embodiment of FIG. 1 are labeled with the same numerals for ease of understanding. The specific principle of the similar component has been explained in detail in the previous paragraphs, and unless it has a cooperative relationship with the components of FIG. 5, it is not repeated here.

As shown in FIG. 5, the difference between FIG. 5 and FIG. 1 is that the information output unit 113b and the information transmission unit 113c in the first terminal device 110, the information receiving unit 121, the information decompression unit 122 and the first play unit 123 in the second terminal device 120 can be implemented by a "video streaming unit 130". In other words, the network information transmission method can be applied to a video (media) streaming unit 130 communicating between the first terminal device 110 and the second terminal device 120. The video streaming unit 130 can be a hardware device or a third-party software program that is configured to perform video conferencing or live streaming.

In one embodiment, the video streaming unit 130 can implement the function of "the information output unit 113b, the information transmission unit 113c, the information receiving unit 121, the information decompression unit 122 and the first play unit 123" by the video conference program installed in the first terminal device 110 and/or the second terminal device 120. Taking a third-party video conference programs as an example, the above step S132 is performed by the video streaming unit 130 of the first terminal device 110, and steps S14, S151 are performed by the video streaming unit 130 of the second terminal device 120.

As mentioned above, other management programs or hardware can be installed in the first terminal device 110 and the second terminal device 120, so that the media source 111, the information processing unit 112, the information integration output unit 113, the screen capture unit 124a, the information reverse unit 125 and the second play unit 126 can be matched with the video streaming unit 130 above. For example, the media source 111, the information processing unit 112, the information integration output unit 113, the screen capture unit 124a, the information reverse unit 125 and the second play unit 126 may be software/program developed by manufacturers or developers, for use with the above third-party video conference program. In one embodiment, the media source 111, the information processing unit 112 and the information integration output unit 113 (the information integration unit 113a) may be integrated into one execution unit for managing the information security. Similarly, the screen capture unit 124a, the information reverse unit 125 and the second play unit 126 can also be integrated into an execution unit for managing the information security.

Figure 6:
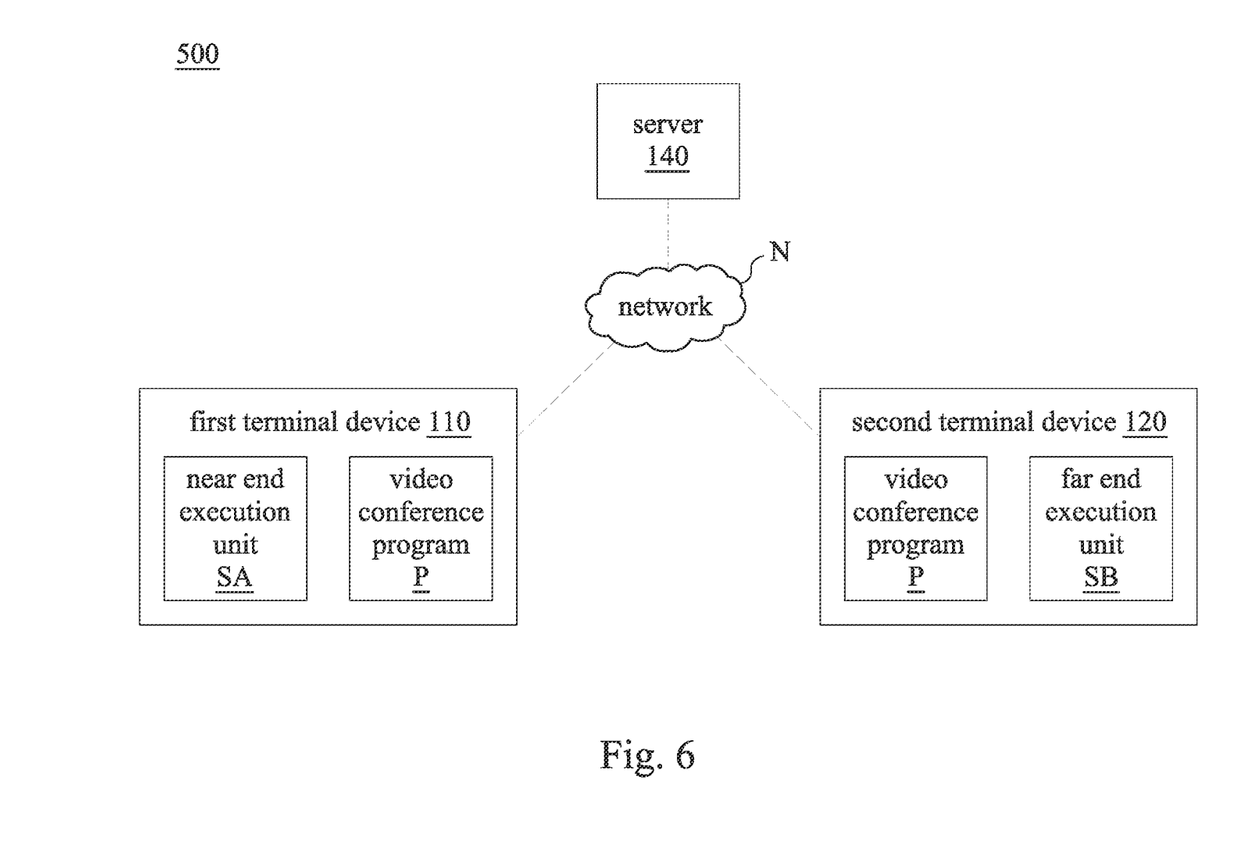
FIG. 6 is a schematic diagram of a network information transmission system in other embodiments of the present disclosure.

FIG. 6 is a schematic diagram of a network information transmission system 500 in some embodiments of the present disclosure, wherein both the first terminal device 110 and the second terminal device 120 are installed with a video conference program P of a third party (e.g., Zoom, Microsoft Teams, Skype, Google Meet, Cisco Webex, etc.), so as to connect to the server 140 of the video conference program through the video conference program P of the third party. In FIG. 6, the similar components associated with the embodiment of FIG. 1 are labeled with the same numerals for ease of understanding. The specific principle of the similar component has been explained in detail in the previous paragraphs, and unless it has a cooperative relationship with the components of FIG. 6, it is not repeated here.

As shown in FIG. 5 and FIG. 6, in some embodiments, the near end execution unit SA may be implemented by the media source 111, the information processing unit 112 and the information integration unit 113a of the network information transmission system 100 in FIG. 5. The far end execution unit SB may be implemented by the screen capture unit 124a, the information reverse unit 125 and the second play unit 126. The near end execution unit SA is configured to process the first broadcast information D10 to generate the processed first broadcast information D11. Next, the near end execution unit SA integrates the processed first broadcast information D11 into the second broadcast information D20 to generate the integrated second media information D21.

As mentioned above, after the first terminal device 110 generate the integrated second media information D21 through the near end execution unit SA, the integrated second media information D21 is encoded or compressed through the video conference program P of the third party, and transmitted to the second terminal device 120. The second terminal device 120 will also decode or decompress the received data through the video conference program P of the third party to obtain the integrated second media information D21.

When the second terminal device 120 plays the integrated second media information D21 through the video conference program, the second terminal device 120 simultaneously captures image through the far end execution unit SB, so as to obtain the processed first media information D11 or the first media information D10 based on the integrated second media information D21. Accordingly, since the first media information D10 will not be directly presented in the video conference program P of the third party, the security of the information can be ensured.

In summary, in one embodiment, the network information transmission method of the present disclosure can further be applied to the video streaming unit (e.g., the video conferencing unit) communicating with the first terminal device 110 and the second terminal device 120. "the video streaming unit (the video conferencing unit)" can be the video conference program P of the third party and/or a hardware device (e.g., the server 140 that provides the video conference of the third party). The operation is described here: the first terminal device 110 is configured to receive the first media information D10, and process the first media information D10 to obtain the processed first media information D11, wherein the processed first media information D11 includes the major data of the first media information D10.

Next, the first terminal device 110 integrates the processed first media information D11 into the second media information D20 to generate the integrated second media information D21. The integrated second media information D21 includes the second media information D20 and the processed first media information D11 hidden on the second media information D20.

After generating the integrated second media information D21, the video conference program P (the video conferencing unit) of the first terminal device 110 receives the integrated second media information D21, and compresses the integrated second media information D21, so as to output the compressed integrated second media information D21 stream to the second terminal device 120 through the network N (e.g. network streaming).

After the second terminal device 120 receives the compressed integrated second media information D21 through the video conference program P (the video conferencing unit), the second terminal device 120 decompresses the compressed integrated second media information D21. Then, the second terminal device 120 plays the image of the integrated second media information D21 through the video conference program P (the video conferencing unit), and the second terminal device 120 is configured to screen capture the image of the integrated second media information D21 played by the video conference program P (the video conferencing unit).

After screen capturing, the second terminal device 120 is configured to obtain the first media information D10 based on the integrated second media information D21, and the second terminal device 120 plays the first media information D10.

The network information transmission method of the present disclosure can avoid the problem of the information security loophole of the video conference program P (the video conferencing unit). When a user uses the video conference program of the third party to communicate with others, if there is a security loophole in the video conference program of the third party, which causes hackers or viruses to attack the video conference program, the user's video and audio information will be leaked, resulting in a violation of the user's privacy.

Specifically, before a video conference, the user of the first terminal device 110 (i.e., the near end user) and the other user of the second terminal device 120 (i.e., the far end user) respectively drive the execution unit SA, SB which is different from the video conference program of the third party. In one embodiment, the near end execution unit SA may include the information processing unit 112 and the information integration output unit 113 (the information integration unit 113a) in the network information transmission system 100 in FIG. 5. The far end execution unit SB may include the screen capture unit 124a, the information reverse unit 125, the second play unit 126. In some other embodiments, the media source 111 may also be a part of the near end execution unit SA.

Next, after the near end user and the far end user drive the video conference program P of the third party, the user uses the camera of the first terminal device 110 (i.e., the media source 111) to transmit the media information with the far end user of the second terminal device 120 through the near end execution unit SA and the video conference program P, and perform video communication.

In this embodiment, "the first media information D10" is the video data of the near end user generated by the camera of the first terminal device 110. First, the video data of the near end user will be processed to be integrated and hidden on the second media information D20. The second media information D20 can be any data that is substantially different from the content of the first media information D10, such as a preset landscape video. Therefore, the integrated second media information D21 shows a landscape video when playing, but actually hides and entrains the user's video data.

Then, the near end execution unit SA outputs the integrated second media information D21 to the video conference program P. In one embodiment, the near end execution unit SA may be a virtual camera for the video conference program P (or the server 140). Therefore, the video conference program P will receive landscape videos and hidden video data.

As mentioned above, the video conference program P will compress the received data to form the streaming packets D21s, and transmit the streaming packets D21s to the second terminal device 120 through the server 140 or the network N. The second terminal device 120 will unpack the streaming packets D21s through the installed video conference program P, and decompress the data. Then, a built-in player program in the video conference program P will play (and display) an image of the landscape video and a hidden and entrapped users' video data.

When the video conference program P play the image of the landscape video and the hidden and entrapped users' video data, the far end execution unit SB performs screen capturing, to capture the landscape videos and hidden video data. The far end execution unit SB further performs reversing, to reverse and obtain the user's video data. The far end execution unit SB is configured to play the user's video data. In other words, the data play by the video conference program P installed in the first terminal device 110 and the second terminal device 120 are all landscape videos (i.e., the user's video data is hidden.) Therefore, even if the video conference program P has a secure loophole, or the server 140 is attacked by hackers, only the unprivileged landscape videos will be leaked, and the user's video data with real privacy will not be leaked. In addition, the user's video data can be presented through the player program of the execution unit SA and SB, so the far end user can still see the private information sent by the near end user.

Furthermore, it should be noted that both the first media information D10 and the second media information D20 are images in the above embodiment (i.e., the first play unit 123 and the second play unit 126 are display panels), but in other embodiments, the first media information D10 and the second media information D20 can also be the sound information (i.e., the first play unit 123 and the second play unit 126 can be speakers).

In some other embodiments, the first media information D10 may be the image information (i.e., the second play unit 126 can be a display panel), and the second media information D20 may be the sound information (i.e., the first play unit 123 can be a speaker). In some other embodiments, the first media information D10 may be the sound information (i.e., the second play unit 126 can be a speaker), the second media information D20 may be the image information (i.e., the first play unit 123 can be a display panel).

In addition, the video streaming unit 130 can be one-way transmission or two-way transmission. For two-way transmission, the far end execution unit SB has an information processing unit and an information integration unit. Similarly, the near end execution unit SA has a screen/data capture unit, an information reverse unit and a second play unit. For one-way transmission, the network information transmission system can be applied to live streaming.

As mentioned above, the network information transmission method and system of the present disclosure integrate the processed first media information D11 into the second media information D20, so that after receiving the integrated second media information D21, the second terminal device 120 obtains the first media information D10 based on the integrated second media information D21. Accordingly, the user privacy will be strengthened to improve the information security.

The elements, method steps, or technical features in the foregoing embodiments may be combined with each other, and are not limited to the order of the specification description or the order of the drawings in the present disclosure.

It will be apparent to those skilled in the art that various modifications and variations can be made to the structure of the present disclosure without departing from the scope or spirit of the present disclosure. In view of the foregoing, it is intended that the present disclosure cover modifications and variations of this present disclosure provided they fall within the scope of the following claims.

What is claimed is:

1. A network information transmission method, comprising:
   receiving, by a first terminal device, a first media information;
   processing the first media information to obtain a processed first media information;
   integrating the processed first media information into a second media information to generate an integrated second media information;
   outputting the integrated second media information to a second terminal device through a network;
   decompressing, by the second terminal device, the integrated second media information;
   capturing, by the second terminal device, the integrated second media information;
   obtaining the first media information based on the integrated second media information; and
   playing, by the second terminal device, the first media information.

2. The network information transmission method of claim 1, wherein the first media information comprises a first image information and/or a first sound information, and the second media information comprises a second image information and/or a second sound information.

3. The network information transmission method of claim 1, wherein the processed first media information comprises a major data of the first media information.

4. The network information transmission method of claim 3, wherein processing the first media information to obtain the processed first media information comprises:
   obtaining the major data and a temporal redundancy data of the first media information; and
   removing the temporal redundancy data of the first media information.

5. The network information transmission method of claim 1, wherein the integrated second media information comprises the second media information and the processed first media information hidden in the second media information.

6. The network information transmission method of claim 1, wherein integrating the processed first media information into the second media information to generate the integrated second media information comprises:
   hiding the processed first media information in the second media information by a steganography embedding manner.

7. The network information transmission method of claim 1, wherein capturing the integrated second media information comprises:
   playing, by the second terminal device, an image of the integrated second media information; and
   screen capturing the image of the integrated second media information.

8. The network information transmission method of claim 1, wherein outputting the integrated second media information to the second terminal device through the network comprises:
   compressing the integrated second media information to output the integrated second media information to the second terminal device through the network.

9. The network information transmission method of claim 1, wherein the first media information comprising a private user information.

10. A network information transmission method, applied to a video streaming unit communicating between a first terminal device and a second terminal device, wherein the network information transmission method comprises:
    receiving, by the first terminal device, a first media information;
    processing the first media information to obtain a processed first media information, wherein the processed first media information comprises a major data of the first media information;
    integrating the processed first media information into a second media information to generate an integrated second media information, wherein the integrated second media information comprises the second media information and the processed first media information hidden in the second media information;
    receiving, by the first terminal device, the integrated second media information through the video streaming unit;
    compressing, by the first terminal device, the integrated second media information through the video streaming unit, so as to output a compressed integrated second media information to the second terminal device through a network;
    receiving, by the second terminal device, the compressed integrated second media information through the video streaming unit;
    decompressing, by the second terminal device, the compressed integrated second media information through the video streaming unit;
    playing, by the second terminal device, an image of the integrated second media information through the video streaming unit;
    screen capturing, by the second terminal device, the image of the integrated second media information;
    obtaining, by the second terminal device, the first media information based on the integrated second media information; and
    playing, by the second terminal device, the first media information.

11. The network information transmission method of claim 10, wherein the first media information comprises a first image information and/or a first sound information, and the second media information comprises a second image information and/or a second sound information.

12. The network information transmission method of claim 10, wherein the first media information comprising a private user information.

13. The network information transmission method of claim 10, wherein the video streaming unit is a video conference program.

14. The network information transmission method of claim 10, wherein processing the first media information to obtain the processed first media information comprises:
    obtaining the major data and a temporal redundancy data of the first media information; and removing the temporal redundancy data of the first media information.

15. The network information transmission method of claim 10, wherein integrating the processed first media information into the second media information to generate the integrated second media information comprises:
  hiding the processed first media information in the second media information by a steganography embedding manner.

* * * * *